(12) United States Patent
Ito et al.

(10) Patent No.: US 7,859,873 B2
(45) Date of Patent: Dec. 28, 2010

(54) OPERATION CONTROL CIRCUIT

(75) Inventors: Takayuki Ito, Kariya (JP); Masatoshi Hikosaka, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 415 days.

(21) Appl. No.: 12/026,087

(22) Filed: Feb. 5, 2008

(65) Prior Publication Data

US 2008/0198639 A1    Aug. 21, 2008

(30) Foreign Application Priority Data

Feb. 6, 2007    (JP)    ............... 2007-027297

(51) Int. Cl.
   *H02M 7/44*    (2006.01)
   *H02M 7/537*   (2006.01)
(52) U.S. Cl. .................. 363/95; 363/97; 363/131
(58) Field of Classification Search .............. 363/15, 363/95, 97–98, 131–133
   See application file for complete search history.

(56) References Cited

U.S. PATENT DOCUMENTS

| | | | |
|---|---|---|---|
| 5,995,387 A * | 11/1999 | Takahashi et al. | 363/21.04 |
| 6,509,698 B1 * | 1/2003 | Kominami et al. | 315/291 |
| 7,035,417 B1 * | 4/2006 | Packard | 381/94.1 |
| 2005/0231277 A1 * | 10/2005 | Ogawa | 330/98 |
| 2005/0252290 A1 * | 11/2005 | Eguchi et al. | 73/304 R |
| 2007/0171679 A1 * | 7/2007 | Nielsen et al. | 363/16 |

FOREIGN PATENT DOCUMENTS

| | | |
|---|---|---|
| JP | 04342988 | 11/1992 |
| JP | 09074666 | 3/1997 |
| JP | 2000048979 | 2/2000 |
| JP | 2000048979 A * | 2/2000 |

* cited by examiner

*Primary Examiner*—Adolf Berhane
*Assistant Examiner*—Jeffrey Gblende
(74) *Attorney, Agent, or Firm*—Woodcock Washburn LLP

(57) ABSTRACT

It is an object of the present invention to provide an operation control circuit without using a photo-coupler. The operation control circuit controls the operation of an LED in a DC/AC inverter comprising a voltage conversion circuit, a DC/AC conversion circuit for converting output voltage of the voltage conversion circuit to two pieces of AC voltage each with an opposite phase, and an LED which is lit when AC voltage is outputted from the DC/AC conversion circuit. The operation control circuit comprising a rectifier circuit, capacitors connected between the input terminal of the rectifier circuit and the output terminal of the DC/AC conversion circuit, and a comparator circuit connected to the same ground level as the ground level connected to the LED for lighting the LED when voltage V1 outputted from the rectifier circuit is higher than a threshold Vref1.

4 Claims, 2 Drawing Sheets

OPERATION CONTROL CIRCUIT

CROSS-REFERENCE TO RELATED APPLICATIONS

This application claims priority to Japanese Patent Application No. 2007-027297, filed Feb. 6, 2007, the entire contents of which are herein incorporated by reference.

FIELD OF THE INVENTION

The present invention relates to an operation control circuit for controlling the operation of a detection circuit for detecting that AC voltage is outputted from a DC/AC inverter.

DESCRIPTION OF THE RELATED ART

FIG. 1 shows an existing operation control circuit. FIG. 1 shows an operation control circuit in a DC/AC inverter.

The DC/AC inverter 1 shown in FIG. 1 comprises a voltage conversion circuit 22 for stepping up DC input voltage while insulating, a DC/AC conversion circuit 23, and a primary side IC 27 comprising a DC/DC control unit 26 for controlling the operation of the voltage conversion circuit 22 and a secondary side IC 28 for controlling the operation of the DC/AC conversion circuit 23 (for example, see Patent Document 1: Japanese Patent Application No. H4-342988).

The operation control circuit 63 shown in FIG. 1 comprises a photo-coupler 66 composed of a light-emitting diode 64 and a photo-transistor 65, resistors 67, 69 and 70, an npn bipolar transistor 71 and diodes 72 and 73.

The DC/AC inverter 1 shown in FIG. 1 comprises an LED 74 as a detection circuit lighting during the operation of the DC/AC conversion circuit 23 in addition to the above-described circuits.

Next, the operation of the DC/AC inverter 1 shown in FIG. 1 is described. It is assumed that a DC power source, such as a battery or the like, is connected to a +B terminal.

Firstly, when a user operates a switch, which is not shown in FIG. 1, a primary side IC 27 is driven.

Then, when the primary side IC 27 is driven, the DC/DC control unit 26 controls the voltage conversion circuit 22 to raise DC voltage (DC input voltage) inputted to the voltage conversion circuit 22 from the +B terminal.

Then, when a secondary side IC 28 is driven using the DC voltage outputted from the voltage conversion circuit 22, the second side IC 28 controls the DC/AC conversion circuit 23 to convert the DC voltage inputted to the DC/AC conversion circuit 23 from the voltage conversion circuit 22 to two pieces of AC voltages each with an opposite phase. Then, the two pieces of AC voltages are outputted to terminals AC1 and AC2, respectively. The terminals AC1 and AC2 are, for example, connected to outlets to which the plug of an electric machine or the like is connected.

When the primary side IC 27 is driven, for example, by a user switching the switch, the two pieces of AC voltage each with an opposite phase are outputted from the terminals AC1 and AC2, respectively.

Next, the operation of the operation control circuit 63 is described.

The second side IC 28 is driven using the DC voltage outputted from the voltage conversion circuit 22, a control signal S outputted from the secondary side IC 28 becomes high and a photo-coupler 66 is switched on. Then, an npn bipolar transistor 71 is switched on and the LED 74 is lit. When the primary side IC 27 is stopped by a user switching the switch, the output of the voltage conversion circuit 22 is stopped and the drive of the secondary IC 28 is stopped. Then, the control signal S outputted from the secondary IC 28 becomes low level and the photo-coupler 66 is switched off. Then, since the npn bipolar transistor 71 is switched off, the LED 74 is extinguished.

Thus, the user can confirm that the DC/AC inverter 1 normally operates seeing the LED 74 lit.

Since, in the DC/AC inverter 1 shown in FIG. 1 the control signal S outputted from the secondary side IC 28 is transmitted to the LED 74 via the photo-coupler 66, even when the level of the ground connected to the DC/AC conversion circuit 23 and the secondary side IC 28 and that connected to the LED 74 on the primary side are different from each other, the control signal S can light/extinguish the LED 74 without affected by a difference in a ground level.

However, since the photo-coupler 66 is more expensive than other devices, such as a resistor, capacitor and the like, it is desired to compose the operation control circuit 63 without using the photo-coupler 66.

SUMMARY OF THE INVENTION

It is an object of the present invention to provide an operation control circuit capable of being composed without using a photo-coupler.

The operation control circuit of the present invention is a DC/AC inverter comprising a voltage conversion circuit for stepping up/down DC input voltage while insulating, a DC/AC conversion circuit for converting the output voltage of the voltage conversion circuit to AC voltage, a detection circuit for detecting that AC voltage is outputted from the DC/AC conversion circuit, and an operation control circuit for controlling the operation of the detection circuit. The ground level of the detection circuit has the same potential as the minus side of the DC input voltage. The operation control circuit comprises a rectifier circuit, a capacitor connected between the input terminal of the rectifier circuit and output terminal of the DC/AC conversion circuit, and a comparator circuit for operating the detection circuit when the output voltage of the rectifier circuit becomes higher than a threshold based on the ground level of the detection circuit.

In this way, by connecting a capacitor between the input terminal of the rectifier circuit and output terminal of the DC/AC conversion circuit, the output stage of the DC/AC conversion circuit and the input stage of the comparator circuit can be insulated each other. Therefore, the comparator circuit can control the operation of the detection circuit without being affected by the difference in a ground level between the DC/AC conversion circuit and the detection circuit. Since the detection circuit can be operated without using a photo-coupler, costs can be reduced.

The DC/AC inverter of the present invention comprises a voltage conversion circuit for stepping up/down DC input voltage while insulating, a DC/AC conversion circuit for converting the output voltage of the voltage conversion circuit to AC voltage, a detection circuit for detecting that AC voltage is outputted from the DC/AC conversion circuit, and an operation control circuit for controlling the operation of the detection circuit. The ground level of the detection circuit has the same potential as the minus side of the DC input voltage. The operation control circuit comprises a rectifier circuit, a capacitor connected between the input terminal of the rectifier circuit and output terminal of the DC/AC conversion circuit, a buffer circuit to which the output voltage is inputted from the rectifier circuit and which outputs voltage based on the ground level of the detection circuit, and a comparator circuit for operating the detection circuit when the output voltage of the buffer circuit becomes higher than a threshold based on the ground level of the detection circuit.

The DC/AC inverter of the present invention comprises a voltage conversion circuit for stepping up/down DC input voltage while insulating, a DC/AC conversion circuit for converting the output voltage of the voltage conversion circuit to AC voltage, a detection circuit for detecting that AC voltage is outputted from the DC/AC conversion circuit, and an operation control circuit for controlling the operation of the detection circuit. The ground level of the detection circuit has the same potential as the minus side of the DC input voltage. The operation control circuit comprises a rectifier circuit, a capacitor for cutting a DC component from the output of the DC/AC conversion circuit, and a comparator circuit for operating the detection circuit when the output voltage of the rectifier circuit becomes higher than a threshold based on the ground level of the detection circuit.

The DC/AC inverter can further comprise a resistor connected in series with the capacitor, between the input terminal of the rectifier circuit and the output terminal of the DC/AC conversion circuit.

According to the present invention, the operation control circuit can be composed without using a photo-coupler and thereby costs can be reduced.

DESCRIPTION OF THE PREFERRED EMBODIMENT

The preferred embodiment of the present invention is described below with reference to the drawings.

Figure 1:
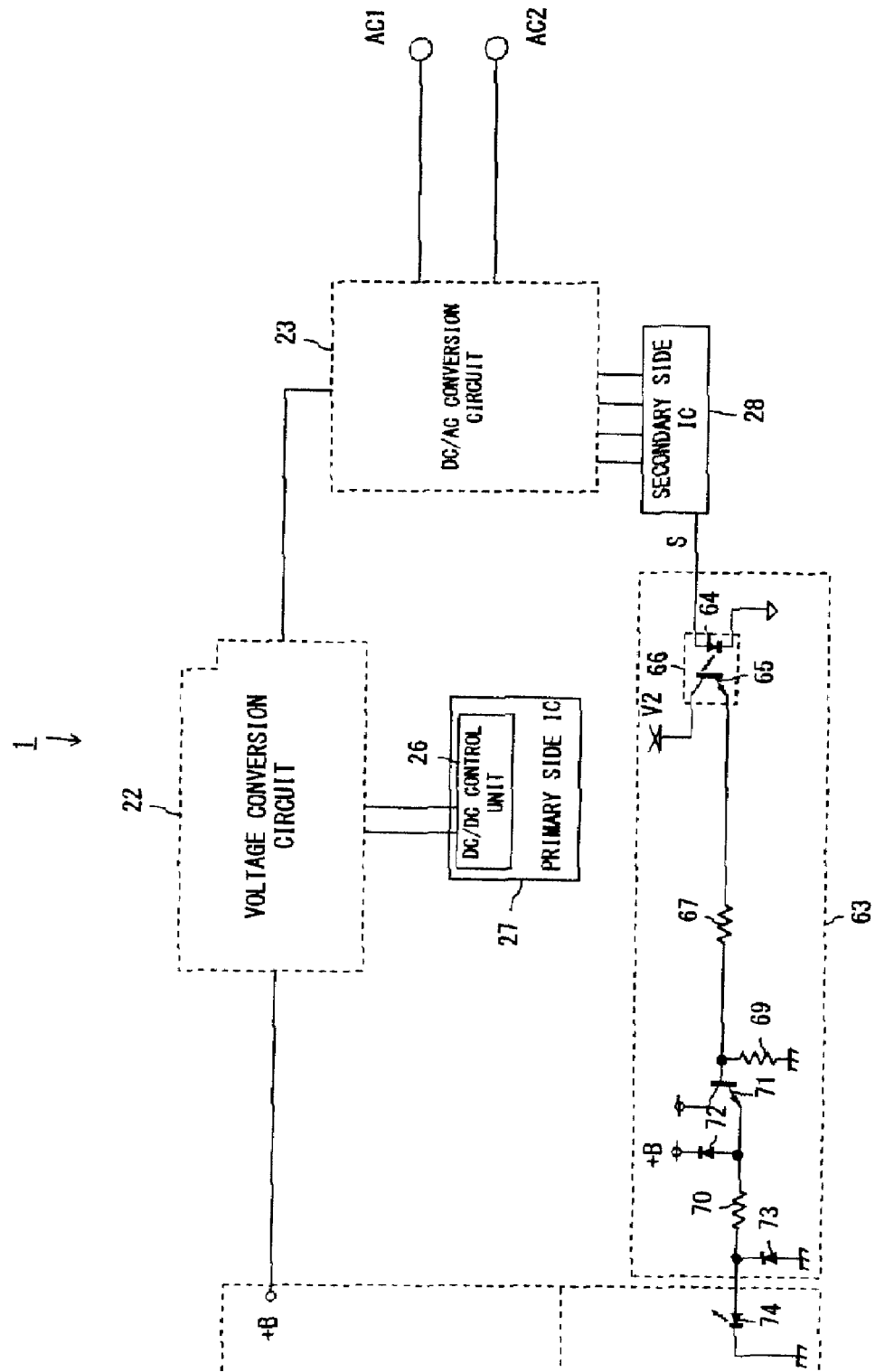
FIG. 1 shows the existing operation control circuit.
Figure 2:
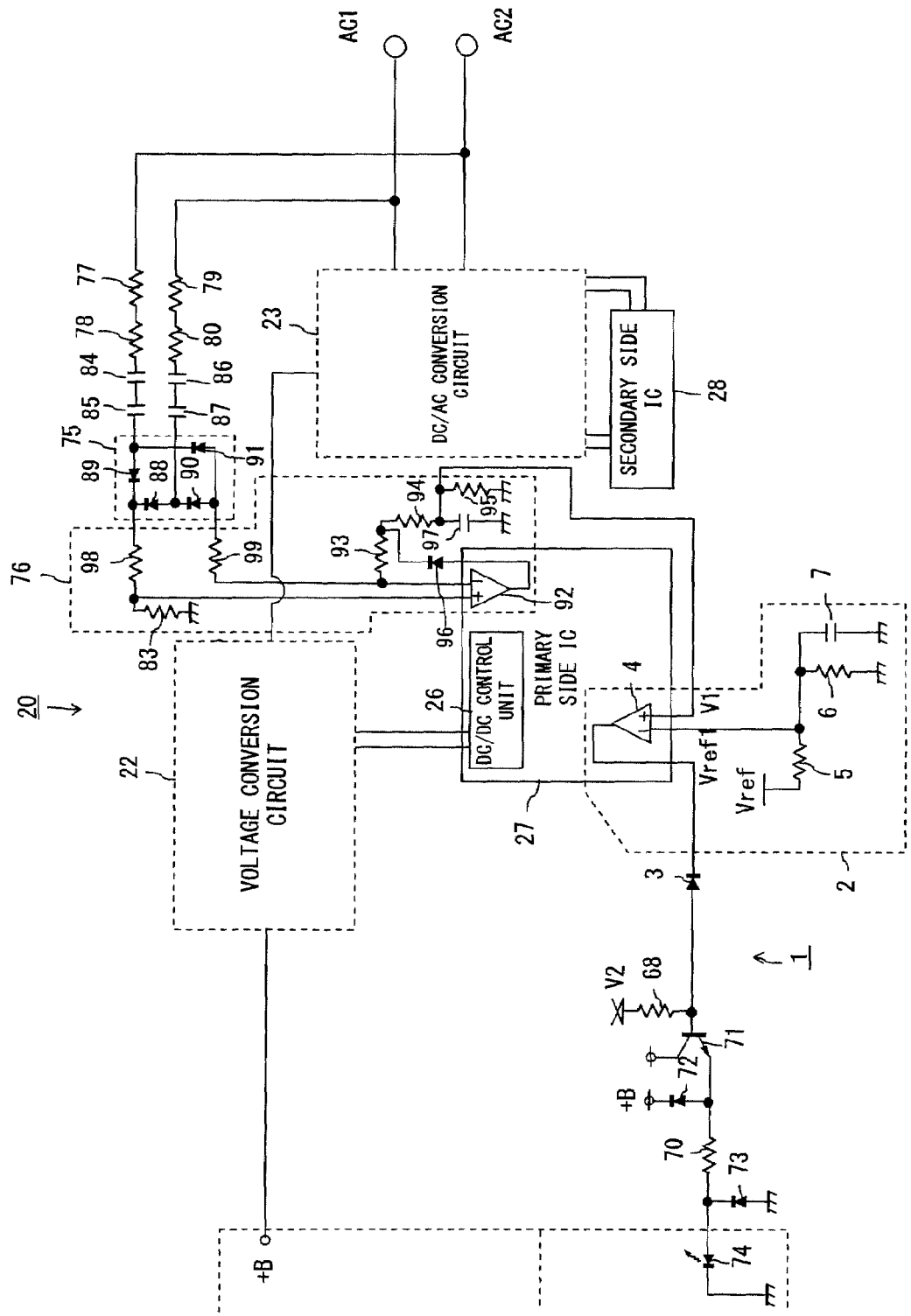
FIG. 2 shows the operation control circuit in the preferred embodiment of the present invention.

FIG. 2 shows the operation control circuit in the preferred embodiment of the present invention. The same numerical references are attached to the same components as the components shown in FIG. 1. The DC/AC inverter 1 shown in FIG. 2 comprises the voltage conversion circuit 22, the DC/AC conversion circuit 23, the primary side IC 27, the secondary side IC 28, and the LED 74 like the DC/AC inverter 20 shown in FIG. 1.

The operation control circuit shown in FIG. 2 comprises resistors 77~80, capacitors 84~87, a rectifier circuit 75, an output circuit 76 (buffer circuit), a comparator circuit 2, a diode 3, resistors 68 and 70, an npn bipolar transistor 71, and diodes 72 and 73.

The rectifier circuit 75 comprises diodes 88~91. The rectifier circuit 75 rectifies the output of the DC/AC conversion circuit 23 and outputs high voltage and low voltage.

The output circuit 76 comprises resistors 83, 93~95, 98 and 99, an operational amplifier 92, a diode 96, and a capacitor 97. The output circuit 76 outputs the difference between the high voltage and low voltage which are outputted from the rectifier circuit 75 based on the same level as the level of the ground connected to the comparator circuit 2.

The comparator circuit 2 comprises a comparator 4, resistors 5 and 6, and a capacitor 7.

Next, the operation of the operation control circuit 1 in this preferred embodiment.

Firstly, the capacitors 84~87 cut DC components from the two pieces of AC voltage each with an opposite phase, outputted from the DC/AC conversion circuit 23 and the diodes 88~91 rectify them into high voltage and low voltage. Specifically, the rectifier circuit 75 outputs the high voltage from the diode 88 or 89 to the plus input terminal of the operational amplifier 92 of the output circuit 76 and also outputs the low voltage to the minus input terminal of the operational amplifier 92 from the diode 90 or 91.

Then, the output circuit 76 outputs the difference between two pieces of voltage rectified by the rectifier circuit 75 based on the same level as the level of the ground connected to the comparator circuit 2. Specifically, the output circuit 76 divides the high voltage outputted from the rectifier circuit 75 by the resistors 98 and 83 and inputs them to the plus input terminal of the operational amplifier 92, also divides the low voltage outputted from the rectifier circuit 75 by the resistors 99 and 93 and inputs them to the minus input terminal of the operational amplifier 92 and divides the output of the operational amplifier 92 by resistors 94 and 95 and outputs them to the plus input terminal of the comparator 4 of the comparator circuit 2 as voltage V1.

Then, the comparator circuit 2 compares voltage V1 outputted from the output circuit 76 with a threshold Vref1. When the voltage V1 is higher than the threshold Vref1, the comparator circuit 2 switches on the npn bipolar transistor 71 to switch on the LED 74. Specifically, when the voltage V1 inputted to the plus input terminal of the comparator 4 is higher than voltage (threshold Vref1) inputted to the minus input terminal of the comparator 4, the comparator circuit 2 outputs high level voltage from the output terminal of the comparator 4 to switch on the npn bipolar transistor 71 for switching on the LED 74. It is assumed that reference voltage Vref applied on the resistors 5 and 6 and voltage V2 applied on the resistor 68 are generated by the primary side IC 27.

Then, when the primary side IC 27 is stopped by the user switching the switch, the output of the voltage conversion circuit 22 is stopped to stop the drive of the secondary side IC 28. Then, the output of the DC/AC conversion circuit 23 is stopped to drop the output of the operational amplifier 92. Then, the voltage V1 becomes lower than the voltage Vref1 to make the output voltage of the comparator 4 low level. Therefore, the npn bipolar transistor 71 is switched off to extinguish the LED 74.

In this way, since in the operation control circuit 1 of this preferred embodiment, the capacitors 84~87 can insulate between the output stage of the DC/AC conversion circuit 23 and the input stage of the comparator circuit 2, the comparator circuit 2 can light/extinguish the LED 74 without being affected by the difference in a ground level between the DC/Ac conversion circuit 23 and the LED 74. Thus, since the LED 74 can be lit/extinguished without using a photo-coupler, costs and a component area on a substrate can be reduced.

Since in the operation control circuit 1 of this preferred embodiment, the output circuit 76 outputs voltage rectified by the rectifier circuit 75 at the same level as the level of the ground connected to the comparator circuit 2 and inputs the outputted voltage V1 to the plus input terminal of the comparator 4, the reliability of the result compared by the comparator circuit 2 can be improved and thereby the LED 74 can be lit more accurately.

In the operation control circuit 1 of this preferred embodiment, the resistors 77~80 can prevent too much current from flowing into the capacitors 84~87.

Although in the operation control circuit 1 of this preferred embodiment, the LED 74 is lit in the DC/AC inverter 1, the LED 74 can be also lit in the DC/DC converter. For example, in a DC/DC converter for outputting DC voltage outputted from the voltage conversion circuit 22 to the outside, the DC voltage outputted from the voltage conversion circuit 22 can be also inputted to the plus input terminal of the comparator 4.

Although in the operation control circuit 1 of this preferred embodiment, voltage outputted from the rectifier circuit 75 is outputted to the comparator circuit 2 via the output circuit 76, the voltage outputted from the rectifier circuit 75 can be also outputted directly to the comparator circuit 2 without passing through the output circuit 76. In this case, high level voltage outputted from the rectifier circuit 75 is outputted to the plus input terminal of the comparator 4.

Although in the operation control circuit 1 of this preferred embodiment, voltage outputted from the operational amplifier 92 is divided by the resistors 94 and 95 and is outputted to the plus input terminal of the comparator 4, the voltage outputted from the operational amplifier 92 can be also outputted directly to the plus input terminal of the comparator 4.

In the above-described preferred embodiment, two of the resistors 77 and 78 and two of the resistors 79 and 80 can be also one, respectively.

In the above-described preferred embodiment, two of the capacitors 84 and 85 and two of the capacitors 86 and 87 can be also one, respectively.

In the above-described preferred embodiment, a display device, such as an LC display and the like, can be also used as the detection circuit instead of the LED 74.

The voltage conversion circuit 22 in the above-described preferred embodiment can be a step-down circuit.

The connection relationship among devices composing the operation control circuit 1 shown in FIG. 2 is described below. It is assumed below that the ground level connected to the LED 74 and the input stage of the voltage conversion circuit 22 are ground A (the same potential as the minus side of the DC voltage inputted to the voltage conversion circuit 22). It is assumed below that the ground level connected to the output stage of the voltage conversion circuit 22, the output stage of the DC/AC conversion circuit 23, and the secondary side IC 28 are ground B.

Firstly, the resistors 77 and 78 and the capacitors 84 and 85 are all connected in series. Then, the resistor 77 is connected to one output terminal of the DC/AC conversion circuit 23. The resistors 79 and 80 and the capacitors 86 and 87 are all connected in series. Then, the resistor 79 is connected to the other output terminal of the DC/AC conversion circuit 23. The capacitor 85 is connected to the anode terminal of the diode 89 and the cathode terminal of the diode 91. The capacitor 87 is connected to the anode terminal of the diode 88 and the cathode terminal of the diode 90. The cathode terminal of the diode 89 is connected to the cathode terminal of the diode 88 and one terminal of the resistor 98. The anode terminal of the diode 90 is connected to the anode terminal of the diode 91 and the resistor 99.

Then, in the above-described output circuit 76, the other terminal of the resistor 98 is connected to one terminal of the resistor 83. The other terminal of the resistor 83 is connected to the ground A. The plus input terminal of the operational amplifier 92 is connected to the connection point of the resistors 98 and 83. The minus input terminal of the operational amplifier 92 is connected to the connection point of the resistors 99 and 93. The resistor 93 is connected to the cathode terminal of the diode 96 and one terminal of the resistor 94. The other terminal of the resistor 94 is connected to one terminal of the resistor 95 and one terminal of the capacitor 97. The other terminal of the resistor 95 and the other terminal of the capacitor 97 are connected to the ground A. The output terminal of the operational amplifier 92 is connected to the anode terminal of the diode 96.

Then, in the above-described comparator circuit 2, the plus input terminal of the comparator 4 is connected to the connection point of the resistors 94 and 95. The minus input terminal of the comparator 4 is connected to the connection point of the resistors 5 and 6. Resistors 5 and 6 are connected in series. The reference voltage Vref is applied to the resistor 5. The resistor 6 is connected to the ground A. One terminal of the capacitor 7 is connected to the connection point of the resistors 5 and 6. The other terminal is connected to the ground A.

The cathode terminal of the diode 3 is connected to the output terminal of the comparator 4. The anode terminal of the diode 3 is connected to the connection point of the base terminal of the npn bipolar transistor 71 and the resistor 68. The voltage V2 is applied to the resistor 68. Prescribed voltage is applied to the collector terminal of the npn bipolar transistor 71. The emitter terminal of the npn bipolar transistor 71 is connected to the anode terminal of the diode 72 and one terminal of the resistor 70. The above described power source voltage is applied to the cathode terminal of the diode 72. The other terminal of the resistor 70 is connected to the cathode terminal of the diode 73 and the anode terminal of the LED 74. Each of the anode terminal of the diode 73 and the cathode terminal of the LED 74 is connected to the ground A.

What is claimed is:

1. A DC/AC inverter, comprising:
   a voltage conversion circuit for stepping up or down input DC voltage while insulating;
   a DC/AC conversion circuit for converting output voltage of the voltage conversion circuit to AC voltage;
   a detection circuit for detecting that AC voltage is outputted from the DC/AC conversion circuit; and
   an operation control circuit for controlling the operation of the detection circuit, wherein ground level of the detection circuit has the same potential as the minus side of the input DC voltage, and the operation control circuit comprises:
   a rectifier circuit;
   a first capacitor connected between one input terminal of the rectifier circuit and one output terminal of the DC/AC conversion circuit, the first capacitor being for insulating the one input terminal of the rectifier circuit and the one output terminal of the DC/AC conversion circuit from each other;
   a second capacitor connected between an other input terminal of the rectifier circuit and an other output terminal of the DC/AC conversion circuit, the second capacitor being for insulating the other input terminal of the rectifier circuit and the other output terminal of the DC/AC conversion circuit from each other; and
   a comparator circuit for operating the detection circuit when output voltage from the rectifier circuit is higher than a threshold based on ground level of the detection circuit.

2. The DC/AC inverter according to claim 1, further comprising:
   a first resistor connected in series to the first capacitor, between the one input terminal of the rectifier circuit and the one output terminal of the DC/AC conversion circuit; and
   a second resistor connected in series to the second capacitor, between the other input terminal of the rectifier circuit and the other output terminal of the DC/AC conversion circuit.

3. A DC/AC inverter, comprising:
   a voltage conversion circuit for stepping up or down input DC voltage while insulating;
   a DC/AC conversion circuit for converting output voltage of the voltage conversion circuit to AC voltage;

a detection circuit for detecting that AC voltage is outputted from the DC/AC conversion circuit; and an operation control circuit for controlling the operation of the detection circuit, wherein ground level of the detection circuit has the same potential as the minus side of the input DC voltage, and the operation control circuit comprises:

a rectifier circuit;

a capacitor connected between an input terminal of the rectifier circuit and an output terminal of the DC/AC conversion circuit;

a buffer circuit for receiving positive output voltage and negative output voltage from the rectifier circuit and outputting a difference between the positive output voltage and the negative output voltage based on ground level of the detection circuit; and a comparator circuit for operating the detection circuit when output voltage from the buffer circuit is higher than a threshold based on ground level of the detection circuit.

4. The DC/AC inverter according to claim 3, further comprising a resistor connected in series to the capacitor, between the input terminal of the rectifier circuit and the output terminal of the DC/AC conversion circuit.

* * * * *